United States Patent [19]

Hunter

[11] 4,372,372
[45] Feb. 8, 1983

[54] SHOWER BATH ECONOMIZER

[76] Inventor: Raymond Hunter, 2112 Ivy St., Chattanooga, Tenn. 37404

[21] Appl. No.: 228,331

[22] Filed: Jan. 26, 1981

[51] Int. Cl.³ .............................................. F24H 3/00
[52] U.S. Cl. .................................. 165/47; 165/109 T; 165/163; 165/DIG. 12; 237/8 R; 4/598
[58] Field of Search ...................... 165/47, 109 T, 163, 165/DIG. 12; 4/598; 237/8 R

[56] References Cited

U.S. PATENT DOCUMENTS

| | | | |
|---|---|---|---|
| 1,769,265 | 7/1930 | Labus | 165/163 |
| 2,530,519 | 11/1950 | Guggenheim | 165/163 |
| 3,946,802 | 3/1976 | Christenson | 165/35 |
| 4,150,787 | 4/1979 | Braathen | 126/361 X |
| 4,300,247 | 11/1981 | Berg | 4/598 |
| 4,304,292 | 12/1981 | Cardone et al. | 165/1 |

Primary Examiner—Samuel Scott
Assistant Examiner—Margaret A. Focarino
Attorney, Agent, or Firm—Alan Ruderman

[57] ABSTRACT

A heat exchanger disposed in the piping of the drain line of a shower bath closet for conducting heat from the spent shower bath water to the water entering the cold water inlet of the shower bath. The heat exchanger has at least two concentric helical coils through which the incoming water flows and over which the spent bath water flows. A central core baffle directs the spent water between the helical coils for good transfer of heat. The spent water preheats the incoming cold water thereby reducing the amount of hot water required from the water heater.

8 Claims, 3 Drawing Figures

SHOWER BATH ECONOMIZER

BACKGROUND OF THE INVENTION

This invention relates to the reclaiming of heat from spent shower bath water exiting from the shower closet drain to the sewerage system, and more particularly to a method and apparatus for recovering and transferring the heat of the spent shower bath water to the fresh cold water entering the shower bath thereby to reduce the supply from the hot water tank.

In conventional shower bath installations the spent water exits unimpeded through the shower closet drain to the sewerage system thereby wasting all the heat remaining in the water. Since most people use shower bath water having a temperature range between approximately 102° F. (38.9° C.) to 110° F. (43.3° C.) the spent water exiting the shower closet has a temperature range of approximately 94° F. (52.2° C.) to 102° F. (38.9° C.) and the available heat is conventionally unused. The temperature of the water supplied by conventional hot water heaters normally ranges between 124° F. (69.4° C.) and 160° F. (88.9° C.) and is mixed with incoming cold water of approximately 60° F. (33.3° C.) to 65° F. (36.1° C.) supplied to the building to obtain the desired shower bath temperature. When there are a number of persons in a family residence, a centrally supplied multi-family dwelling, or a hotel/motel building, the amount of hot water supplied by the water heater and the energy required to heat the cold supply water in the heater may be substantial.

SUMMARY OF THE INVENTION

The present invention effects an energy saving by transferring heat from the spent shower bath water to the cold water supplied to the shower bath closet thereby reducing the amount of hot water supplied from the water heater. To this end, one aspect of the present invention provides a heat exchanger in the outlet line of the spent water leaving the shower bath closet and directs the incoming cold inlet water through the heat exchanger thereby raising its temperature prior to entry into the shower bath closet necessitating less hot water supplied by the water heater.

Consequently, it is a primary object of the present invention to reduce the energy required during shower bathing by reducing the amount of hot water supplied by the conventional water heating system.

It is another object of the present invention to transfer heat from the spent water exiting a shower bath closet to the incoming cold supply water by inserting a heat exchanger in the spent water exit piping and the cold supply inlet piping.

Preferably the heat exchanger is inserted downstream of the shower bath closet drain and the incoming cold water through the heat exchanger just prior to entry into the shower bath closet. In the preferred form of the invention the heat exchanger is of the counter-flow type, i.e. the spent water and the incoming cold supply water separately flow in opposite directions, and the heat exchanger has a number of helical coils of tubing through which the cold supply water flows while the spent bath water passes about the exterior surface of the coils.

Another aspect of the present invention is the preferred form of the heat exchanger, this being a housing within the drain line comprising a pair of concentric spaced tubular coils, for cold supply water flowing within both coils to the shower bath closet and the spent bath water flowing between the coils. In the preferred form of the heat exchanger the spent bath water is baffled to flow between the inner and outer coils and includes baffled means for preventing the spent water from flowing through the annulus of the inner coil. The baffle means preferably comprises a central core member within the annulus of the inner coil.

Thus, a further object of the present invention is the provision of a heat exchanger downstream of the spent water drain of a shower bath closet in the path of the incoming cold supply water, the heat exchanger having tubing through which the cold supply water flows and about which the spent bath water passes.

It is a still further object of the present invention to provide a heat exchanger downstream of the spent water drain of a shower bath closet in the path of the incoming cold supply water, the heat exchanger having a number of heat transfer coils through which the cold supply water flows while the spent bath water passes over the exterior surface thereof.

It is a still further object of the present invention to provide a heat exchanger that can be inserted into the outlet drain line and the cold inlet supply water line of a shower bath closet, the heat exchanger having at least a pair of spaced coils through which the cold supply water may flow and over which the spent drain water passes.

It is still yet another object of the present invention to provide a heat exchanger adapted to be inserted into the outlet drain line and the cold inlet supply water line of a shower bath closet, the heat exchanger having at least a pair of spaced coils through which the cold supply water flows and over which the spent drain water passes, the heat exchanger including a baffle for directing the spent bath water to flow only in the annulus between the spaced coils.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
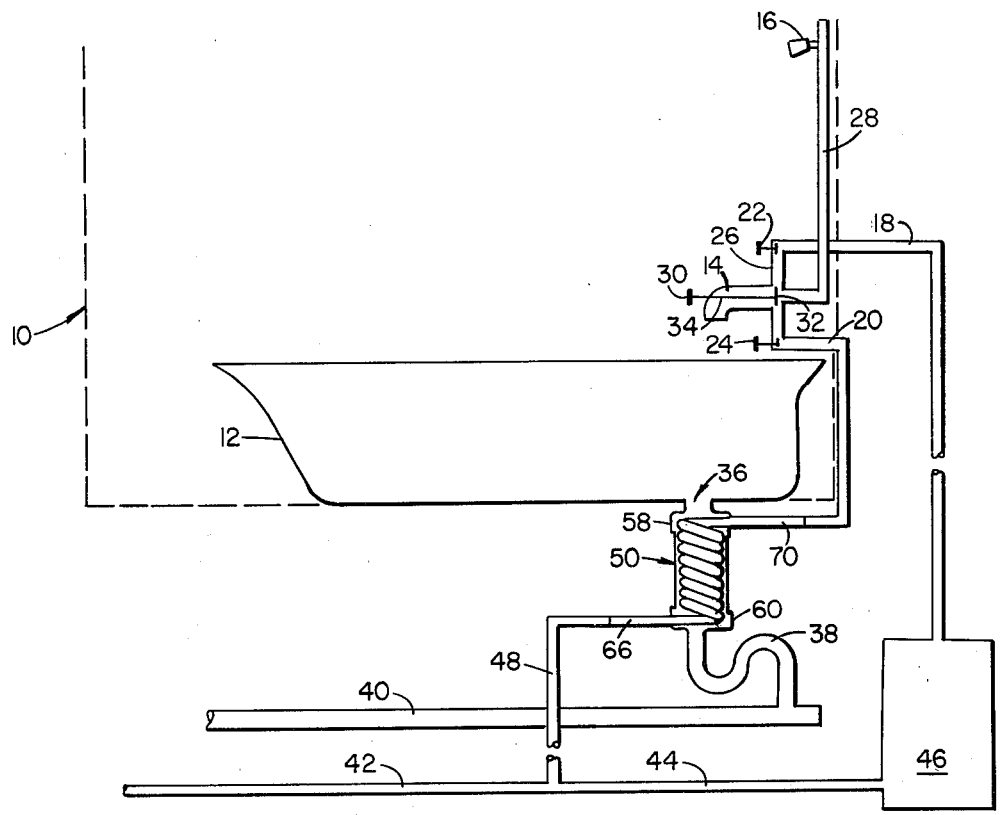
FIG. 1 is a diagrammatic view of a shower bath system embodying the principles of the present invention with parts thereof disconnected for clarity of presentation.

Referring now to the drawings, there is illustrated in FIG. 1 the economizer apparatus of the present invention installed within otherwise conventional shower bath apparatus comprising a shower bath closet generally indicated at 10 and may be in the form of a stall, but for purposes of illustration is disclosed as a tub 12. The shower bath closet conventionally includes inlet water supply means comprising a bath faucet 14 and a shower head faucet 16 interconnected with hot and cold water supply lines 18 and 20 respectively. A conventional valve 22 controls the flow of hot water from the line 18 while a similar valve 24 controls the flow of cold water from the line 20. A mixing conduit 26 interconnects the downstream side of the valves 22 and 24 and opens into the faucet 14 and into a line 28 communicating with the shower head 16. A control member 30 connected to a plate valve 32 by means of a rod 34 may selectively control the flow of inlet water to either the bath tub faucet 14 or the shower head 16. Extension of the stem 34 by pulling outwardly on the member 30 closes the path of the water to the faucet so that the inlet water may flow to the shower head 16, while depression of the stem 34 closes the path of the water to the shower head and opens the path to the faucet. A conventional drain opening 36 is formed at the bottom of the tub 12 so that the spent water may exit the tub. In conventional shower baths the spent water exiting through the drain 36 thereafter flows through a trap 38 into the sewerage pipe 40. Conventionally the building supply water enters through a conduit 42 and branches off into a number of pipes such as 44 supplying inlet water to the hot water heater 46 and to a pipe 48 which conventionally connects directly to the inlet pipe 20 to the shower bath closet. The present invention, however, inserts an economizer generally indicated at 50 in the shower bath outlet line between the drain 36 and the trap 38 and between the cold water supply lines 48 and 20.

Figure 2:
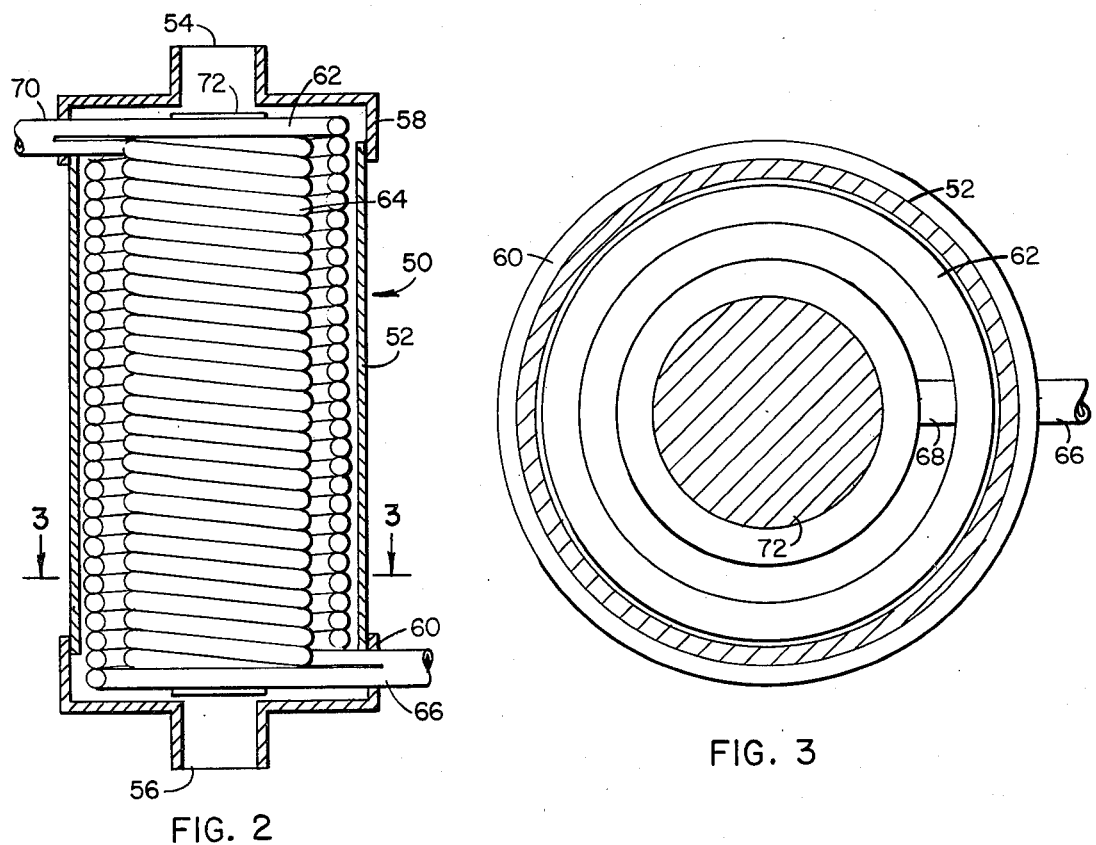
FIG. 2 is a diagrammatic longitudinal cross sectional view through the preferred form of the heat exchanger illustrated in FIG. 1.
Figure 3:
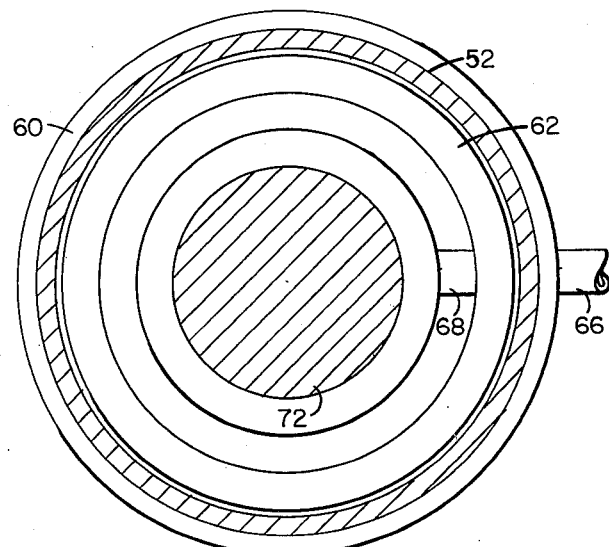
FIG. 3 is a cross sectional view of the heat exchanger taken substantially along line 3—3 of FIG. 2.

Referring now to FIGS. 2 and 3 the economizer comprises a housing 52 having a spent water inlet aperture 54 at its upper end and a spent water outlet aperture 56 at its lower end. Preferably the housing may be an open ended hollow cylindrical shell having open ended caps 58 and 60 secured thereto at its upper and lower ends respectively. It has been found that conventional three inch diameter PVC piping is effective as the body of the shell with the cap members 58 and 60 comprising conventional PVC three inch to one and one half inch diameter reducer couplings, the small end of the couplings connecting with the conventional one and one half inch diameter drain opening 36 and trap 38.

Mounted within the body of the economizer is a heat conducting conduit comprising a first helically coiled copper tube 62 which preferably extends the full length of the housing 52 and, as illustrated, from adjacent the reduced portion of the member 60 to adjacent the reduced portion of the member 58. This first heat transfer coil has an outer circumference of a diameter substantially equal to slightly less than the inside diameter of the housing 52 and a central annulus between opposed surfaces of the inner circumference. Disposed within the annulus is a second helical heat conducting coil 64 having an outer circumference spaced from the inner circumference of the outer coil 62 defining a flow path therebetween for the spent bath water flowing from inlet 54 to outlet 56. An inlet conduit 66 enters the economizer at the bottom through the cap member 60 and communicates with both coils 62 and 64 by means of a connector 68 which may be in the form of a Y or other convenient form at the bottom of the coils. In a similar manner an outlet conduit 70 communicates with both coils 62 and 64 at their tops and exits from the economizer at the top through the cap member 58. With the exception of the connections to the conduits 66 and 70 the coils 62 and 64 are closed so that cold supply water is directed to flow from the supply line 48 through the conduit 66 and the coils, and then out the conduit 70 to the line 20 when the valve 24 is open.

It should thus be understood that the spent water exiting the drain 36 flows over the coils 62,64 thereby preheating the cold water flowing through the coils. To provide a greater transfer of heat a baffle in the form of a central core 72 is disposed within the annulus of the coil 64. The baffle core has an outer diameter substantially equal to the inside diameter of the inner circumference of the coil 64 so that substantially all of the spent bath water flows in the flow path between the two coils, thereby to ensure that the spent bath water heats both coils for maximum transfer of heat. The baffle core 72 comprises a cylindrical member closed at least at the top and for this purpose a sealed PVC pipe has been found to function successfully.

By providing two concentric spaced heat exchange coils in the aforesaid manner a greater heat transfer surface is available than would be with a single coil carrying an equal supply of incoming cold water. Of course more than two such coils may be utilized and remain with the scope of the present invention, but satisfactory results have been attained with the illustrated construction. For example, with an economizer fifteen inches in length, and two ¼ inch diameter copper transfer coils, and the temperature of the incoming supply water at 60° F. (33.3° C.), the temperature of the water exiting from the conduit 70 has been found to be 88° F. (31.1° C.) when the spent shower closet water exiting the drain 36 was 94° F. (52.2° C.). Consequently, the amount of hot water required to be supplied by the water heater 46 and the energy required for a shower bath is reduced.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. In a shower bath closet having cold and hot water supply means including a cold water pipe, a spent water drain, and a trap communicating said drain with a sewerage conduit, apparatus for preheating the cold water supplied by the cold water pipe to the water supply means to effect a reduction in the quantity of hot water necessary for a shower bath, said apparatus comprising: a heat exchanger including an elongated substantially cylindrical housing intermediate said drain and said trap, said housing having a spent water inlet at one end connected in flow communication with said drain and a spent water outlet at the opposite end connected in communication with said trap, whereby spent water exiting said drain flows through said heat exchanger prior to entry into said trap, at least one substantially cylindrical continuous helical coil having a central annulus within and extending substantially the length of said housing, said coil being spaced within said housing to define an uninterrupted annular space extending the length of said coil to provide a linear flow path, a core disposed within the central annulus of said coil forming a baffle, said core including means for preventing flow of spent water through said central annulus and for directing the spent water into the uninterrupted annular space for passage of spent water over the surface of the coil and through the uninterrupted annular space, means connecting one end of said coil to said cold water pipe, and means connecting the other end of said coil to said cold water supply means.

2. Apparatus as recited in claim 1, wherein said helical coil comprises a cylindrical tube having a finite outside diameter tightly coiled about the axis of the helical coil, the lead of the helix being substantially equal to said outside diameter, whereby each turn of said coil abuts at least one adjacent turn of said coil.

3. Apparatus as recited in claim 1, including at least a second substantially cylindrical continuous helical coil substantially concentric with said first helical coil and disposed in said uninterrupted annular space intermediate said first coil and said housing while permitting the uninterrupted annular space to exist between the first and second coils.

4. Apparatus as recited in claim 3, wherein each of said helical coils comprises a cylindrical tube having a finite outside diameter tightly coiled about the axis of the respective helical coil, the lead of each helix being substantially equal to the respective outside diameter, whereby each turn of each coil abuts at least one adjacent turn of the same coil.

5. A heat exchanger for preheating the cold water supply to a shower bath by conduction of heat from the spent water exiting the drain, comprising: a hollow elongated substantially cylindrical housing including a spent water inlet at one end and a spent water outlet at the other end, at least a first heat conducting elongated conduit in the form of a substantially cylindrical helical coil having a central annulus disposed within said housing, said coil being spaced within said housing to define an uninterrupted annular space extending the length of said conduit to provide a linear flow path, an elongated core disposed within the central annulus of said coil forming a baffle, said core including means for preventing flow of spent water through said central annulus and for directing the spent water into said uninterrupted annular space for passage of spent water over the surface of the coil and through the uninterrupted annular space, a cold water outlet adjacent said one end and a cold water inlet adjacent said other end, and means communicating said cold water inlet and said cold water outlet with said conduit.

6. A heat exchanger as recited in claim 5, wherein said helical coil comprises a cylindrical tube having a finite outside diameter tightly coiled about the axis of the coil, the lead of said helix being substantially equal to said outside diameter, whereby each turn of said coil abuts at least one adjacent turn of said coil.

7. A heat exchanger as recited in claim 5, including at least a second substantially continuous helical coil substantially concentric with said first helical coil and disposed in said uninterrupted annular space intermediate said first coil and said housing while permitting the uninterrupted annular space to exit between the first and second coils.

8. A heat exchanger as recited in claim 6, wherein each of said helical coils comprises a cylindrical tube having a finite diameter tightly coiled about the axis of the respective coil, the lead of each helix being substantially equal to their respective diameter, whereby each turn of each coils abuts at least one adjacent turn of the same coil.

* * * * *